Oct. 17, 1961 G. H. FRITZINGER Re. 25,056

ADHESIVE APPLICATORS

Original Filed May 25, 1956 2 Sheets-Sheet 1

INVENTOR

George H. Fritzinger

ADHESIVE APPLICATORS
Original Filed May 25, 1956 2 Sheets-Sheet 2
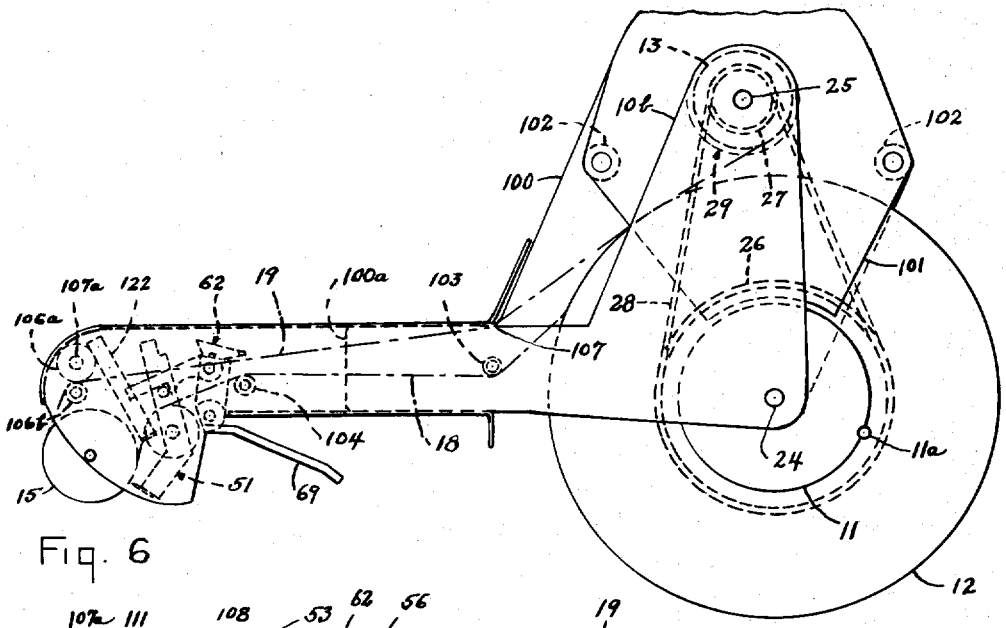
Fig. 6
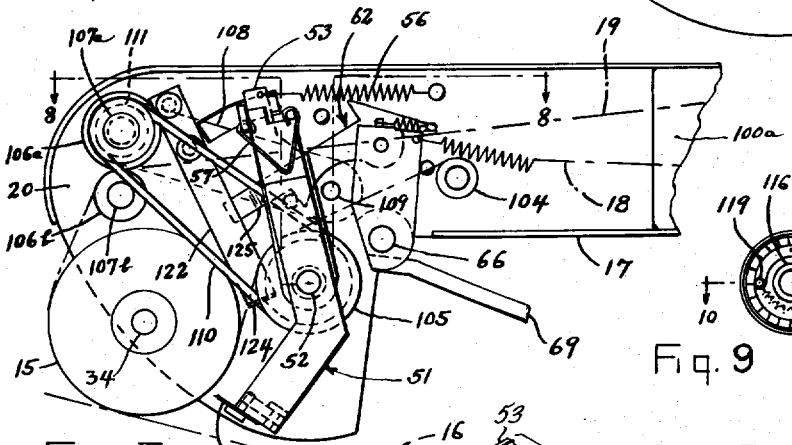
Fig. 7
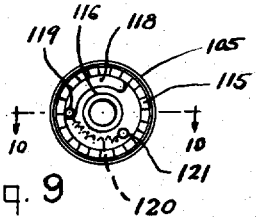
Fig. 9
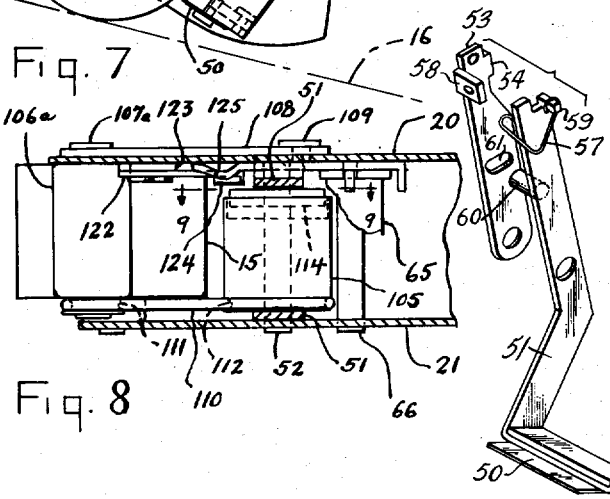
Fig. 8
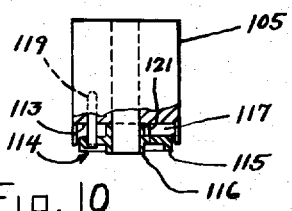
Fig. 10
Fig. 11
INVENTOR
George H. Fritzinger United States Patent Office Re. 25,056
Reissued Oct. 17, 1961

25,056

ADHESIVE APPLICATORS

George H. Fritzinger, 18 Oakridge Road, West Orange, N.J.

Original No. 2,909,301, dated Oct. 20, 1959, Ser. No. 587,366, May 25, 1956. Application for reissue June 3, 1960, Ser. No. 33,872
21 Claims. (Cl. 156—523)

Matter enclosed in heavy brackets [ ] appears in the original patent but forms no part of this reissue specification; matter printed in italics indicates the additions made by reissue.

This invention relates to devices for applying pressure sensitive adhesive film to surfaces to be coated and, particularly, to such devices which are adapted for applying adhesive film of pressure sensitive transfer tape known also as pressure sensitive release tape.

Such tape [has a] *comprises an adhesive film having two pressure-sensitive adhesive surfaces one of which is covered by a non-adhesive* backing film typically of paper treated so that it is poorly adherent to the adhesive film. The tape is provided in roll form and can be unwound without offsetting of the adhesive film. After the tape is applied to a surface, the backing film can be peeled off to leave only a pressure sensitive adhesive coating.

The applicators of the present invention are adapted for applying the adhesive film of such tape and for removing the backing film during the applying operation.

An object of my invention is to provide new applicators for the purpose stated which are simple, economical and dependable.

Another object is to provide such applicators with a novel cutting mechanism adapted to enable the easy application of any desired length of adhesive film.

Another object is to provide such applicators with a simple mechanism which is left in a ready state for the start of a succeeding application after each cutting operation.

Another object is to provide an adhesive applicator wherein the adhesive film is supplied with a reenforcing backing throughout its length from the supply roll to the point of application.

Another object is to provide effective means for severing the adhesive film while it is applied to its reenforcing backing means and while maintaining continuity of the backing means to enable resumption of feed-out of the adhesive film after each cutting operation.

Another object is to provide an applicator with means to sever or weaken the adhesive film on a cross line thereof before it reaches the surface being coated and to lock the adhesive film against further feed-out when the line of severance reaches approximately the place of application whereby upon moving the applicator onwardly after the feed-out is locked the adhesive film is separated at the line of severance.

Another object is to provide an equalized blade mounting which is adapted to provide a uniform cutting action across the full width of the adhesive film.

Another object is to provide an improved applicator roller which is poorly adherent to the adhesive film to enable a positive transfer of the adhesive film from the roller to the surface being coated.

Another object is to provide an adhesive applicator with a take-up means for the backing film which is operated by power derived from the applying operation. A further object in this respect is to operate the take-up roller by power derived from the unwinding of the supply roll.

A further object is to provide such applicators with a means which tends to overdrive the take-up roller through a friction slip coupling whereby the backing film is constantly tensioned and peeled positively from the adhesive film during an applying operation.

Another object is to provide an applicator for adhesive film which operates to feed the tape itself across the surface being coated and to peel the backing film off at the point of application. Further objects in this respect are to provide means for cutting the adhesive film without severing the backing film, and for cutting the adhesive film at a distance from the point of application and to lock automatically the feed-out of the tape when the line of sevrance reaches nearly the point of application.

Further objects are to provide manual applicators with trigger-operated cutting means and lost-motion feed locking means wherein the lock is removed upon release of the trigger.

These and other objects and features of my invention will be apparent from the following description and the appended claims.

In the description of my invention reference is had to the accompanying drawings, of which:

FIGURE 6 is a side elevation to reduced scale showing a second embodiment of my invention;

FIGURE 7 is a side elevation to normal scale of the forward portion of this second embodiment, showing the side cover removed;

FIGURE 8 is a fractional section on the line 8—8 of FIGURE 7;

FIGURE 9 is a fractional sectional view taken on the line 9—9 of FIGURE 8;

FIGURE 10 is a plan view of the mechanism shown in FIGURE 9 with parts appearing in section on the line 10—10 of that figure; and FIGURE 11 is an exploded perspective view of the cutting mechanism.

Figure 1:
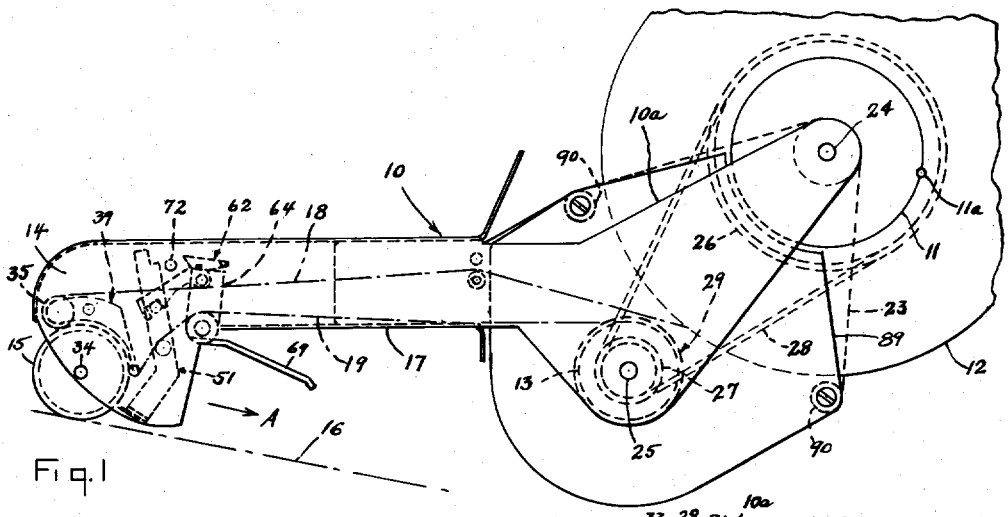
FIGURE 1 is a side elevational view of one embodiment of adhesive applicator according to my invention, showing the applicator to reduced scale with a portion of the tape supply roll broken away and with certain internal parts dottedly indicated.
Figure 2:
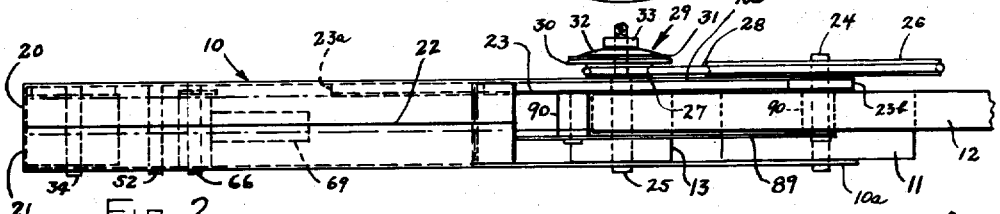
FIGURE 2 is a top plan view of this embodiment.

The applicator shown in FIGURES 1 to 5 comprises a housing 10 having a tail structure carrying a cylindrical roller 11 for supporting a supply roll 12 of pressure sensitive transfer tape and a roller 13 for taking up the backing ing film of the tape; a head structure 14 carrying operating mechanism including an applicator roller 15 extending beyond the housing for rolling engagement with a surface to be coated designated by dash lines 16; and a hollow intermediate handle portion 17 through which passes the tape 18 from the supply roll 12 in one direction and the backing film 19 to the take-up roller 13 in the other direction. The supply roll is locked to the support roller 11 by a locking screw 11a interposed between the roller and the annular core of the supply roll.

The housing comprises two drawn metal sections 20 and 21 which have the same contour as viewed from the side but which have flanges along the top and bottom of the handle portion and along the top and front of the head portion that are bent respectively to the left and right to meet one another on an intermediate plane 22 to form a hollow structure. The tail structure of each housing section is simply a rearwardly and upwardly extending vertical plate 10a having the contour shown in FIGURE 1. The back housing section 20 constitutes a frame for the operating mechanism and the other section 21 is simply a removable cover releasably secured in place by suitable means not shown.

The tail plate 10a of the frame section 20 is reenforced by a plate 23 at its inner side having a smaller forward portion secured to the handle 17 and a larger rearward portion substantially wider than the tail plate 10a to provide a protective shield for the supply roll and the tape wound on the take-up roller. The plate 23 is spaced from the tail plate by a block 23a in the handle and a disk 23b at its far end. Journalled in the tail structure are shafts 24 and 25 for the rollers 11 and 13 respectively. Secured to the shaft 24 is a large pulley 26 and journalled on the shaft 25 is a relatively small pulley 27. The pulleys are inter-connected by a belt 28 and the pulley 27 is coupled to its shaft 25 by a friction slip clutch 29 to cause the take-up roller to be driven by the unwinding of tape from the supply roll. The clutch comprises a disk 30 secured to the pulley 27, an adjacent disk 31 keyed to the shaft 25, a spring washer 32 against the disk 31 and a nut 33 threaded on the shaft for adjusting the pressure between the disks.

Figure 3:
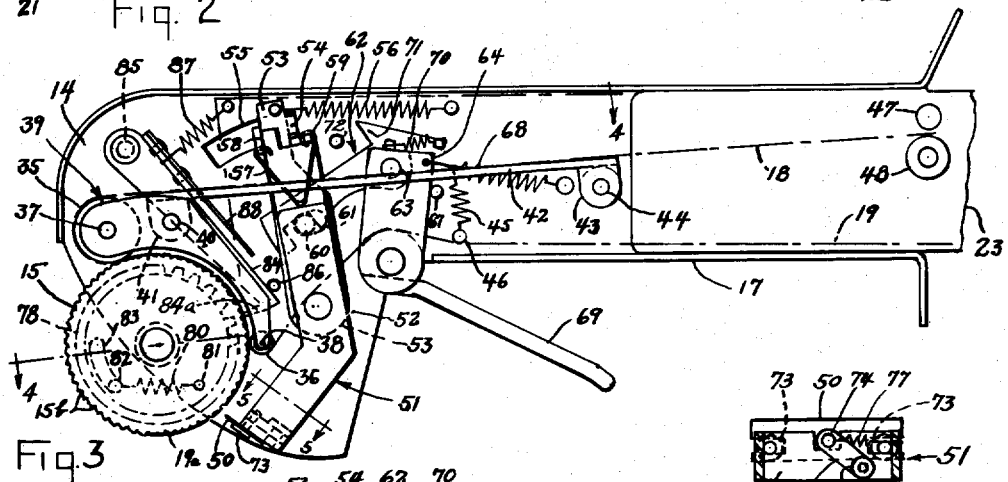
FIGURE 3 is a side elevational view to normal scale of the forward portion of this applicator, showing the side cover removed.

The applicator roller 15 is journalled on a shaft 34 secured to the side wall of the head portion of the frame 20. Riding on the periphery of the top portion of this roller is a larger pressure roller 35 and a smaller pressure roller 36. These rollers are journalled on respective shafts 37 and 38 carried at their ends by arcuate plates of a U bracket 39. This U bracket is pivoted at 40 to a pair of apertured lugs 41 turned down from a relatively long lever 42 extending backwardly into the handle where it has another pair of apertured lugs 43 turned down therefrom and pivoted to a stud 44 secured to the side of the frame 20. A tension spring 45 is connected between this lever and a stud 46 therebelow on the frame 20 to draw the lever downwardly and press the rollers 35 and 36 against the applicator roller. As shown in FIGURE 3 the tape 18 is led into the handle between two vertically spaced guide members 47 and 48 with the adhesive side facing upwardly, then across the lever 42 and around the larger pressure roller 35 into adhesive engagement with the applicator roller, and next around the applicator roller to the smaller pressure roller 36. At this point the backing film 19 is peeled from the adhesive film across the bottom of the pressure roller 36 and led back through the handle to the take-up roller 13, leaving the adhesive film 19a on the applicator roller ahead of the pressure roller 36.

Since the tape 18 is in adhesive engagement with the applicator roller throughout the distance between the pressure roller 35 and pressure roller 36, it is drawn positively from the supply roll 12 as the applicator roller is rolled across a surface in the direction of the arrow A. By making the ratio of the diameters of the pulleys 26 and 27 at least greater than the ratio of the diameter of a full-sized supply roll to the diameter of the take-up roller, it is assured that the take-up roller is overdriven always through the slip clutch by the unwinding of the supply roll to tension the backing film and peel it from the adhesive film as the adhesive film is fed out onto the surface being coated.

The adhesive film 19a is provided typically with a fibrous reenforcing so that it has an appreciable tensile strength. This assures positively against the film being offset from the applicator roller where the backing film 19 is peeled off. In order that the adhesive film will be transferred positively from the applicator roller to the surface 16 being coated, *it must have less adherence to the applicator roller than to the surface being coated. As a means of reducing the adherence of the adhesive film to the applicator roller to enable positive transfer of the adhesive film to the surface 16* [regardless of whether the surface is one to which the adhesive has a strong adherence or not] the applicator roller is *provided with a peripheral surface* made of a material which is inherently poorly adherent to the adhesive film such as of a silicone compound—for example, silicone rubber—or the surface is treated with a suitable release agent such as of silicone by methods well known in the art. Instead or additionally thereto the periphery of the applicator roller is provided with both circumferential grooves 15a shown in FIGURE 4 and crosswise grooves 15b shown in FIGURE 3. The crosswise grooving aids the cutting *of the adhesive film 19a applied to the applicator roller* as will appear, and provides good traction with the surface to be coated for driving the roller at the start of an applying operation.

A retaining plate 89 is mounted on spacers 90 secured to the reenforcing plate 23 to provide with the latter plate side walls for confining the backing film as it is wound on the take-up roller 13. Also, the retaining plate 89 serves to retain the tape where it is drawn from the supply roll in juxtaposition with the reenforcing plate 23.

Figure 5:
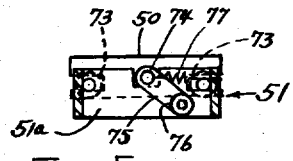
FIGURE 5 is a fractional section taken on the line 5—5 of FIGURE 3 to show the blade mounting.
Figure 4:
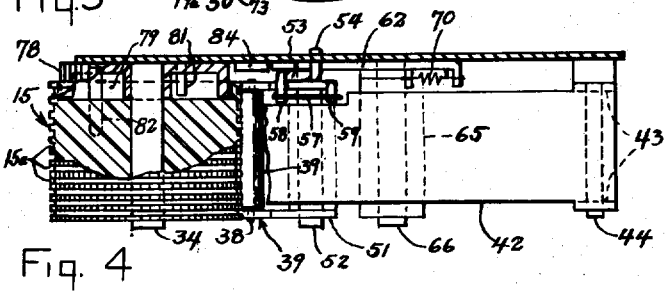
FIGURE 4 is a top fractional view taken substantially on the line 4—4 of FIGURE 3.

A mechanism is provided for severing the adhesive film 19a before it reaches the surface being coated while maintaining continuity of feed-out of the adhesive film and while leaving the applicator at the end of each application in a ready state for the start of a succeeding application. The cutting is accomplished by striking the periphery of the applicator roller with a blade 50 mounted on the cross member 51a of a U lever 51 having angled side legs, as shown in FIGURES 3 and 5, pivoted centrally thereof on a stud 52 secured to the side of the frame 20. Pivoted also on this stud between the U lever and the frame in parallel relation to the adjacent leg of the U lever is an actuating arm 53 clearly shown in FIGURE 11. This arm has a lug 54 bent over and passing through an arcuate slot 55 in the side wall of the frame 20 to form a stop for the arm by abutment of the lug against the back end of the slot as shown in FIGURE 3. The arm is held normally in this stop positioned by a blade actuatable spring 56 connected between the upper end of the arm and a pin on the frame. The actuating arm is coupled to the U-shaped blade lever by a V spring 57 connected between a lug 58 bent over from the actuating arm past the leading edge of the adjacent leg of the blade lever and a lug 59 bent over from the back edge of this leg of the blade lever. The V spring is a light spring of the compression type which holds the blade lever yieldably against the lug 58 in which position the blade 50 is at a clearance distance from the applicator roller as shown in FIGURE 3. Secured to the blade lever 51 about midway between the pivot stud 52 and the upper end of the blade lever is a stud pin 60 which extends through a clearance slot 61 in the actuating arm 53. Between the actuating arm and the side wall of the frame there is a pawl 62 which is engageable with the stud pin at its forward end and pivoted at 63 to an upright arm 64. This arm has a long cylindrical hub 65 at its lower end which is pivoted on a stud 66 secured to the side of the frame 20 at a point spaced backwardly and upwardly from the pivot stud 52 for the blade lever. The arm 64 is urged rearwardly against a stop pin 67 by a tension spring 68 but is operable forwardly by a fingerpiece 69 secured to the hub and extending out of the housing at an angle of about 25 degrees to the handle portion thereof. The pawl 62 is urged lightly downwardly into engagement with the stud pin 60 on the blade lever by a light tension spring 70 between the arm 64 and a lug on the rear end of the pawl.

When the fingerpiece 69 is pressed inwardly the pawl pushes against the stud pin 60 to move the blade lever 51 counter-clockwise and withdraw the blade from the applicator roller. At the same time the blade lever pushes against the lug 58 to move the actuating arms 53 therewith to charge the spring 56. At the end of the inward movement of the fingerpiece a tooth 71 of the pawl 62 strikes a stationary pin 72 on the frame and causes the pawl to be raised out of engagement with the stud pin 60. When this disengagement occurs the actuating arm 53 is propelled by the spring 56 with an impulse in a clockwise direction until the stop lug 54 strikes the end of the slot 55. The blade lever is likewise so propelled by the lug 58 on the actuating arm and acquires a momentum which *at the instant the actuating arm is stopped by impingement of the lug 54 against the end of the slot 55* causes an overthrow *of the blade lever in a clock-wise direction away from the lug 58* [thereof past its normal position] against the light retarding force of the V spring 57 with the result that the blade is impinged once against the applicator roller and returned to normal position *against the lug 58.*

This impingement of the blade against the applicator roller serves to so sever or weaken the adhesive film 19a thereon that it separates readily at this point at the end of an applying operation, as will appear. However, in order to obtain equalized pressure along the blade against the roller, with a positive and uniform cutting action, the blade is pivotally secured to the blade lever at a point midway its length and is yieldably mounted to shift sidewise of the roller the instant it comes into engagement therewith. This is accomplished by slidably retaining the blade 50 to the blade lever with loose pin-slot mountings 73 as indicated in FIGURE 5, and securing the blade at its midpoint 74 to a short link 75 at an angle of about 35 degrees to the pivot axis of the blade lever, the other end of the link being pivoted at 76 to the cross member of the blade lever. A tension spring 77 is connected between the free end of the link and one leg of the blade lever so as to yieldably press the blade in a forward position parallel with the applicator roller is defined by the pin-slot mountings 73. When the blade strikes the applicator roller the spring 77 yields and the link is turned counter-clockwise (FIGURE 5) to free the blade from its abutment against the pins of the mountings 73 so that it can turn about its pivot 74 to equalize its pressure against the applicator roller, and at the same time the blade is shifted lengthwise along the roller to provide a slicing type of cutting action. The blade may have a straight or serrated edge but need not be razor sharp. Since the blade is struck against the applicator roller the latter is preferably made of a slightly soft or yieldable material having good shear resistance such as of aluminum, plastic or rubber.

When the finger-piece 69 is depressed to [operate] *strike* the [cutting mechanism] *blade 50 against the applicator roller 15 as before described* a lost-motion lock is [put into operation to stop the feed-out of the adhesive film, the lock becoming operative when] *rendered operative to cause the applicator roller 15 to become locked when it has been turned clockwise enough to bring* the line of severance where the adhesive film was struck by the blade [reaches] substantially *to* but [is] not beyond the place where the film is being applied to the surface being coated. This lock comprises a ratchet wheel 78 between the applicator roller and the frame 20 on the shaft 34. The end wall of the applicator roller confronting the ratchet wheel is recessed to receive a portion of the wheel, and the confronting end wall of the wheel is itself provided with a cylindrical recess 79 to receive a tension spring 80 connected at one end to a pin 81 on the ratchet wheel and at the other end to a pin 82 threaded into the applicator roller. This latter pin extends through an arcuate slot 83 in the ratchet wheel to permit about 45 degrees lost motion between the ratchet wheel and roller. The spring 80 is so directed as to hold the pin 82 normally against the trailing end of the slot, with respect to the forward direction of rotation of the roller, so that the ratchet wheel is drawn along with the roller. A pawl 84 is pivoted at 85 against the inside wall of the frame 20 and extends downwardly from its pivot axis to the back side of the ratchet wheel. The pawl is held yieldably at a clearance spacing from the ratchet wheel against a stop pin 86 by a spring 87. When the finger-piece 69 is depressed to actuate the cutting mechanism an arcuate end portion of the pawl 62 is pressed against a relatively stiff cantilever spring 88 secured to the hub of the pawl 84 and extending therealong at a clearance spacing therefrom, to cause a single tooth 84a of the pawl 84 to engage the ratchet wheel 78, the purpose of the cantilever spring being to provide a yieldable coupling which will "give" should the pawl 84 at first strike a crest of a tooth of the ratchet wheel. By this engagement the ratchet wheel is locked, and upon a forward movement of the applicator roller through about 45 degrees the latter is also locked to prevent further feed-out of the adhesive film. This locking of the roller is adapted to occur preferably just prior to the line of severance on the adhesive film reaching the surface being coated. Upon further advancing the whole applying device after the roller is locked, the roller is slid on the surface being coated to separate the adhesive film already applied from the adhesive film on the roller. Upon thereafter releasing the finger-piece 69 the pawl 84 is disengaged to permit the applicator roller to be rolled again across a surface to be coated. Since the roller was locked before the leading edge of the adhesive film now on the roller reached the point of application, [this leading edge of] the adhesive film *on the applicator roller* will [be the first to] engage the new surface to be coated *leading edge first* to assure positive transfer of the film from the roller.

From the foregoing description it is apparent that I have provided a conveniently operable device for applying successive lengths of adhesive film by merely moving the device on the applicator roller 15 across the surface to be coated and pressing a finger-piece when it is desired to cut the film, the device being again operative to start another application upon merely releasing the fingerpiece.

The embodiment of my invention shown in FIGURES 6–10 comprises many parts which are the same as in the preceding embodiment and which are given the same reference characters. The housing differs only in that its tail plate 10b is differently shaped to permit the supply roll 12 to be mounted below the take-up roller 13. Again, the tail plate is reenforced by a plate 100, corresponding to the previous plate 23, which has a portion 100a engaging and secured to the handle 17. The obliquely upwardly extending portion of this reenforcing plate 100 is substantially wider than the corresponding portion of the tail plate 10b, as shown in FIGURE 6. A retaining plate 101 is mounted on two spacing disks 102 carried by the reenforcing plate to form with the latter two spaced sidewalls to confine the backing film as it is wound on the take-up roller and to maintain the supply roll always in close proximity with the reenforcing plate. Again, the support roller 11 and the take-up roller 13 are intercoupled by a belt and pulley arrangement including the friction slip clutch 29. Since the supply roll 12 is now located below the take-up roller 13 the tape 18 is led past a guide roller 103 at the back end of handle and through the lower portion of the handle across a knurled roller 104 into the head portion of the housing, with the adhesive side of the tape facing downwardly. In the head portion of the housing the tape is led partially around a relatively large roller 105 journalled on the stud 52 between the two upright legs of the blade lever 51, then downwardly and around the bottom of the applicator roller 15, back from the applicator roller between two interengaging tensioning rollers 106a and 106b, and then through the upper portion of the handle, the tape extending back from the applicator roller constituting only the backing film 19, as will appear. At the rear end of the handle the backing film is led across the edge 107 to the take-up roller 13.

Since the take-up roller 13 is again subjected to an overdriving influence through the friction slip clutch 29, the whole run of the tape from the supply roll to the take-up roller is kept under tension. However, in order to assure positively that the tape will be kept tight around the applicator roller the pressure roller 106a is also subjected to an overdriving influence. For example, this roller is journalled on a stud 107a carried by a lever 108 at the outer side of the frame section 20, the lever extending rearwardly from the stud 108 and being pivoted at 109 to the sidewall of the frame section, it being understood that there is a suitable clearance opening in the frame section through which passes the stud 107a. The roller 106b is coupled by a belt 110, preferably a coil spring belt, to the roller 105, the belt riding in a peripheral groove 111 in the pressure roller 106a and in a peripheral groove 112 in the roller 105. Since the tape is drawn across the roller 105 with its adhesive side in engagement therewith, the roller 105 is always driven positively at a peripheral speed equal exactly to that of the feed of the tape. By proper selection of the diameters of the pulley portions of the two rollers, the roller 106a tends to be overdriven. By placing the pivot 109 above the journal axis of the roller 105 part of the tension on the belt 110 is utilized to provide pressure of the roller 106a against the roller 106b itself jounalled on a fixed stub 107b mounted on the sidewall of the frame section 20. Preferably, one or both of the rollers 106a and 106b are provided with a peripheral rubber covering so that they will have a good friction grip on the tape. The applicator roller 15 may have a smooth peripheral surface and be made, for example, of aluminum or of plastic.

The adhesive contact which the tape has with the roller 105 just in advance to where the tape is led onto the applicator roller, and the pinching engagement which the rollers 106a and 106b have with the tape just following the point where the tape is led from the applicator roller, together with the constant tensioning of the tape both from the rollers 106a and 106b, and the take-up roller 13, serve not only to hold the tape tightly around the applicator roller but also to hold it firmly against being displaced sidewise relative to the applicator roller during a taping operation, it being understood that the tape is not in adhesive contact with the applicator roller in this embodiment but that the adhesive side faces outwardly for direct transfer of the adhesive film from the backing film to the surface to be coated as the applicator roller is rolled thereacross. The advantage of so leading the whole tape onto the surface to be coated is that transfer of the adhesive film to that surface is assured, because of the poor adherence which the adhesive film has with the specially treated backing film, without need for an applicator roller with a special adhesive peripheral surface. Thus, in this embodiment, the backing film is peeled positively from the adhesive film at the point of application of the latter to the surface being coated.

The same cutting mechanism is employed as in my first embodiment and need not therefore be further described other than to say that the cutting action—which is to strike the blade against the adhesive side of the tape on the applicator roller and shift the blade slightly along its cutting edge during its impingement—is found to sever the adhesive film positively without cutting or weakening the backing film.

As in my first embodiment the feed out of the tape is locked following actuation of the cutting mechanism and when the line of severance reaches approximately the point of application. However, the lock-up mechanism is operable in this embodiment on the roller 105. For this purpose the roller is provided with a cylindrical recess 113 at one end to receive a small ratchet wheel 114 preferably with some extension of the ratchet wheel beyond the roller. This ratchet wheel has a circular row of teeth 115 on its outer face and has a hub 116 journalled on the stud 52 and extended inwardly to provide a cylindrical space 117 between the ratchet wheel and inner wall of the recess 113. The ratchet wheel has an arcuate slot 118 engaged loosely by a pin 119 anchored to the roller 105, the length of the slot being sufficient to allow approximately 120 degrees of lost motion between the ratchet wheel and the roller 105, this lost motion in terms of peripheral movement of the roller being about the peripheral distance on the applicator roller from the line of severance to the point of application. A tension spring 120 is connected between the pin 119 and a pin 121 on the ratchet wheel to urge the ratchet wheel. When the fingerpiece 69 is depressed 119 abuts against the trailing end of the arcuate slot 118. Mounted on the side wall of the frame 20 and spaced therefrom by a block 123 at its base is a pawl 122 in the form of a cantilever spring extending downwardly into the space between the ratchet wheel and frame and terminating in a lug or tooth 124 which is crosswise to and spaced from the row of teeth 115 on the ratchet wheel. When the fingerpiece 69 is depressed to actuate the cutting mechanism, a bowed extension 125 on the pawl 62 enters between the intermediate portion of the pawl 122 and side wall of the frame to cam the pawl 122 inwardly into locking engagement with the ratchet wheel. Upon the ratchet wheel becoming so locked as the cutting mechanism is actuated, the roller 105 can be turned further forwardly by about 120 degrees before it also will be locked to stop the feed-out of the tape. As before explained, this locking of the feed-out of the tape is set to occur preferably just before the line where the adhesive film has been cut reaches the place where the tape is brought into adhesive contact with the surface being coated.

Although the principle of operation of this second embodiment is different in some respects from my first embodiment, it has the same positive and dependable action enabling easy application of any desired length of adhesive film simply by engaging the applicator roller with the surface to be coated, moving the applicator forwardly and pressing the fingerpiece just before reaching the point where it is desired to terminate the application.

The portable applicator units herein described may be provided with suitable lateral extensions at the side for sliding engagement with a guide rail on the fixture carrying the material to be coated in such applications where close accuracy in the placing of the adhesive film is required. Also, although I have described my invention in terms only of portable units, it will be understood that the applicator mechanism may be stationary except for a movement onto and from the surface to be coated, and a conveyor arrangement may be used to carry the surface being coated past the applicator unit. Such and other modifications will be apparent from the illustrative embodiments herein disclosed without departure from the scope of my invention, which I endeavour to express according to the following claims.

I claim:

1. An applicator for pressure-sensitive transfer tape *comprising an adhesive film having two pressure-sensitive adhesive surfaces and a non-adhesive backing film covering releasably one of said surfaces, said applicator* comprising an applicator roller for carrying [an] *said* adhesive film to a surface to be coated; means for progressively applying said tape into adhesive contact with said roller as the roller is advanced; means for progressively peeling the backing film from said tape as the roller is advanced whereby only the adhesive film of the tape is left on said roller ahead of the point where the backing film is removed; and means for cutting the adhesive film [before it reaches] *on said roller between said point and the point where the roller contacts* the surface to be coated.

2. An applicator for pressure-sensitive transfer tape *comprising an adhesive film having two pressure-sensitive adhesive surfaces and a non-adhesive backing film covering releasably one of said surfaces, said applicator* comprising an applicator roller for carrying *said* adhesive film of the tape to a surface to be coated; means for adhesively applying said tape on to said roller at a first station; means for peeling off the backing film from said tape at a second station spaced peripherally of said roller in the direction of its forward movement from said first station whereby only the adhesive film of the tape is applied to said roller ahead of said second station, said adhesive film being poorly adherent to said roller allowing the adhesive film to be transferred to a surface to be coated as the roller is rolled thereacross; and means for cutting said adhesive film [ahead of] *on said roller between* said second station [prior to] *and the point of* its application to said surface.

3. An applicator for pressure-sensitive tape *comprising an adhesive film having two pressure-sensitive adhesive surfaces and a non-adhesive backing film covering releasably one of said surfaces, said applicator* comprising an applicator roller [on to which], *means for leading* said tape [is] progressively [applied] *into adhesive contact with said roller responsive to* forward rotation of said roller; means for peeling off the backing film from the tape on said roller as the roller is advanced, the adhesive film being poorly adherent to said roller to permit transfer of the *adhesive* film to a surface to be coated as the roller is rolled thereacross; a blade mounted for movement against said roller; and means for actuating said blade.

4. The combination set forth in claim 3 where said blade extends lengthwise of said roller along the active length of the latter, and said actuating means comprises spring means operatively connected to said blade [and], means for withdrawing said blade from said roller [and] against said spring means [and then], *means for* releasing the blade to cause it to strike against said roller, *and a manually depressable trigger connected to said withdrawing means and said releasing means to cause the same to be operated in the sequence here named as the trigger is depressed.*

[5. The combination set forth in claim 3 wherein said blade extends lengthwise of said roller throughout the active length of the latter, including means for causing the blade to shift lengthwise of the roller when it comes into engagement therewith.]

[6. The combination set forth in claim 3 wherein said blade extends lengthwise of said roller throughout the active length of the latter, and wherein said actuating means is pivotally connected to a central portion of said blade to cause the blade to engage said roller with equalized contact pressure along the length of the blade.]

7. An applicator for pressure-sensitive transfer tape *comprising an adhesive film having two pressure-sensitive adhesive surfaces and a non-adhesive backing film covering releasably one of said surfaces, said applicator* comprising an applicator roller on to which said tape is progressively applied *in adhesive contact therewith* by forward rotation of said roller; means for peeling off the backing film from the tape on said roller as the roller is advanced, said roller having shallow transverse screws adapted to render the adhesive film poorly adherent thereto so that the adhesive film will transfer to a surface to be coated as the roller is rolled thereacross; and a transverse blade engageable with said roller in line with said grooves at the head of the point where the backing film is removed for severing the adhesive film before it reaches the surface to be coated.

8. An applicator for applying [the] *to a surface to be coated an* adhesive film of pressure-sensitive transfer tape [onto a surface to be coated] *having a non-adhesive backing film covering releasably one of the adhesive surfaces of the adhesive film,* comprising means for supporting a supply roll of said tape; an applicator roller; means for leading the tape from said supply roll into adhesive contact with the periphery of said applicator roller as the roller is advanced; a take-up roller for the backing film of said tape; means for leading the backing film from a point where it is peeled from the tape on said applicator roller to said take-up roller; and means for exerting an over-driving influence on said take-up roller to tension the backing film and cause it to be peeled from the tape on the applicator roller and wound on the take-up roller as the applicator roller is advanced.

9. The applicator set forth in claim 8 including a drive coupling with friction slip between said take-up roller and said supply roll for exerting a driving force tending to over-drive said take-up roller by the unwinding of said supply roll as said applicator roller is moved across the surface to be coated.

10. An applicator for applying [the] *to a surface to be coated an* adhesive film of a pressure-sensitive transfer tape [onto a surface to be coated] *having a non-adhesive backing film covering releasably one of the adhesive surfaces of the adhesive film,* comprising a rotatable support for a supply roll of said tape; a take-up roller for the backing film of said tape; an applicator roller; pressure means for adhesively engaging the tape from said supply roll with said applicator roller to cause the tape to be drawn from the supply roll as the applicator roller is rolled forwardly across said surface *to be coated*; means driven by said applicator roller for exerting an over-driving influence on said take-up roller to peel the backing film from the tape on said applicator roller and wind it on said take-up roller as the applicator roller is advanced; and means for cutting the adhesive film on said applicator roller ahead of said pressure means.

11. An applicator for the adhesive film of pressure-sensitive transfer tape *having a non-adhesive backing film covering releasably one of the surfaces of said adhesive film,* comprising an applicator roller onto which said transfer tape if progressively applied by forward rotation of said roller; means for peeling off the backing film from the tape on said roller as the roller is advanced, the adhesive film being poorly adherent to said roller to permit transfer of the adhesive film to a surface to be coated as the roller is rolled thereacross; a cutting member; means for moving said cutting member against said applicator roller between the place where the backing film is peeled off and the place where the roller engages said surface; and means operatively coupled to said moving means for applying a lost-motion lock on said applicator roller as an incident to severing the adhesive film on said roller, said block being adapted to stop said roller against further forward rotation just prior to the place where the adhesive film is cut reaching said surface being coated.

12. An applicator for the adhesive film of pressure-sensitive transfer tape *having a non-adhesive backing film covering releasably one of the surfaces of said adhesive film,* comprising a support for a supply roll of said tape; an applicator roller; means *responsive to advancing the roller across a surface to be coated* for adhesively engaging the tape from said supply roll onto said roller at one place and concurrently peeling the backing film of the tape from the roller at another place [as the roller is advanced across a surface to be coated] *spaced peripherally of said roller in the direction of its forward movement from said one place*; means operable to cut the adhesive film on said roller between the place where the backing film is peeled off and the place where the roller engages said surface; a lock for said roller having a lost-motion coupling thereto adapted to permit the roller to be moved further forwardly after the lock is engaged by an angular distance less that that between the place where the adhesive film is cut and the place where the roller engages said surface; and means for causing said locking means to be engaged as an incident to operating said cutting means.

13. An applicator for removing the pressure sensitive means from the backing film of transfer tape and applying the same to a surface to be coated, comprising a support roller for a supply roll of said tape; a take-up roller for the backing film of said tape; an applicator roller onto which the tape is led from said supply roll to bring the pressure-sensitive means thereof progressively into contact with said surface and as said applicator roller is rolled thereacross and from which the backing film is led to said take-up roller; and means for progressively peeling the backing film from the pressure-sensitive means of said applicator roller is rolled across said surface including a friction-slip overdrive coupling between said support roller and said take-up roller for exerting an overdriving force on said take-up roller by the unwinding of said supply roll adapted to tension the backing film throughout its length from said supply roll to said take-up roller during the feeding of the tape.

14. An applicator for applying the adhesive film of pressure-sensitive transfer tape from a supply roll thereof to a surface to be coated, comprising means for leading said adhesive film into adhesive contact with said surface while providing a reinforcing backing for the adhesive film throughout its length from said supply roll to the place of its application to said surface; a cutting member; *a depressable manual member;* means *responsive to depressing said manual member* for actuating said cutting member to cause the same to [engage] *strike once against* said adhesive film on a transverse line at a predetermined distance from said surface; and means operably coupled with said actuating means *and operative while said manual member is depressed* for applying a lost-motion lock on said tape adapted to stop the feed thereof when the cutting line on the adhesive film is at said surface.

15. An applicator for applying [the] *to a surface to be coated an* adhesive film of a pressure-sensitive transfer tape [to a surface to be coated] *having a non-adhesive backing film covering releasably one of the adhesive surfaces of the adhesive film,* comprising means for carrying a supply roll of said tape; means for leading said adhesive film into contact with said surface [while] *to be coated and for* providing a reinforcing backing for the adhesive film *throughout its length* from said supply roll to said place of its application to said surface; means *operable against a portion of said backing* for cutting said adhesive film [without displacing it from its backing] before it reaches said surface *to be coated;* and tensioning means for taking up the backing film of said tape.

16. An applicator for applying [the] *to a surface to be coated an* adhesive film of pressure-sensitive transfer tape [to a surface to be coated] *having a non-adhesive backing film covering releasably one of the adhesive surfaces of the adhesive film,* comprising means for supporting a supply roll of said tape; an applicator roller; a take-up roller for the backing film of said tape; means for leading the tape from said supply roll around said applicator roller and back to said take-up roller with the adhesive side of the tape facing away from the applicator roller for direct transfer to said surface as the applicator roller is rolled thereacross; means tending to overdrive said take-up roller to tension the backing film around said applicator roller; a cutting blade; means for striking said cutting blade against adhesive side of the tape backed by said applicator roller at a distance from the place of engagement of the tape with said surface; and means for causing the tape to become locked against further feed-out when the cutting line on the tape reaches substantially the place of engagement of the tape with said surface.

17. In an applicator for applying [the] *to a surface to be coated an* adhesive film from a supply roll of pressure-sensitive transfer tape [to a surface to be coated] *having a non-adhesive backing film covering releasably one of the pressure-sensitive adhesive surfaces of the adhesive film;* the combination of an applicator roller onto which the tape is lead from said supply roll to cause the adhesive film thereof to be applied to a surface to be coated as said applicator roller is rolled thereacross; means for cutting said adhesive film at a distance from the point of application without [breaking continuity of] *interrupting the* feed-out of the film to said surface; and means responsive to actuation of said cutting means to cause the feed-out of said film to be stopped when the cutting line reaches approximately the point of application.

18. In an applicator for applying [the] *to a surface to be coated an* adhesive film of pressure-sensitive transfer tape [to a surface to be coated] *having a non-adhesive backing film covering releasably one of the adhesive surfaces of the adhesive film;* the combination of means for carrying a supply roll of said tape; means for drawing tape from said supply roll and pressing the adhesive film thereof into progressive contact with said surface, while providing a moving reinforcing backing for the film to the point of its application, as said applicator is moved across said surface, said reinforcing backing being poorly adherent to said film to provide the transfer of the film to said surface; and means operable to lock said reinforcing backing whereby upon further moving said applicator the adhesive film is separated at the point of application.

19. The method of applying [the] *to a surface to be coated an* adhesive film of pressure-sensitive transfer tape [to a surface to be coated] *having a non-adhesive backing film covering releasably one of the pressure-sensitive adhesive surfaces of the adhesive film,* which comprises drawing the tape from a supply roll thereof with the adhesive film backed *on one side* by the backing film of the tape, transferring the adhesive film progressively from the backing film [to] *into adhesive contact with* an applicator roller as the roller is rolled across the surface to be coated, and carrying the adhesive film by the applicator roller into *adhesive* contact with said surface *to be coated.*

20. The combination set forth in claim 4, wherein said actuating means includes means for limiting operation of said spring means to a portion of the stroke of said blade with resultant impingement of the blade against the roller by inertia overthrow of the blade to withdraw the same from the roller after each said impingement.

21. The combination set forth in claim 15 wherein said cutting means comprises a movably mounted blade, a manual control member, and means operative upon each pressing of said control member to cause said blade to strike once against said adhesive film and to be thereupon withdrawn at a clearance distance therefrom.

22. [A] *In a* mechanism for dispensing *an adhesive film having two* pressure-sensitive [means] *adhesive surfaces* carried releasably by a *non-adhesive* backing film and wound in roll form[, comprising]: *the combination of* a journaled member for carrying a supply roll of said backing film with said pressure-sensitive [means] *adhesive film* thereon, means on said journaled member for holding said supply roll in fixed rotational relation thereto, a journaled take-up member separate from said carrying member for reeling up the backing film after removal of said pressure-sensitive [means] *adhesive film,* a roller around which the backing film is led from said supply roll to said take-up member and at which the pressure-sensitive [means] *adhesive film* is peeled from the backing film, and means for driving said take-up member by said carrying member with a force tending to turn said take-up member at a greater rotational speed of said carrying member during the unreeling of said supply roll comprising an over-drive coupling including a friction clutch and a drive coupling transmission between the carrying member and the take-up member having a drive transmission ratio greater than the ratio of the diameter of said supply roll to the diameter of said take-up member for providing an over-driving influence on said take-up member with slippage of said clutch to exert a tensioning force on the backing film during the entire unreeling of the supply roll.

23. The applicator set forth in claim 15 wherein said leading means includes an applicator roller to be rolled across said surface and around which said transfer tape is led from said supply roll to said take-up means with the adhesive film facing outwardly from the applicator roller for direct transfer from the backing film to said surface.

References Cited in the file of this patent

UNITED STATES PATENTS

| | | |
|---|---|---|
| 1,257,009 | MacLaurin | Feb. 19, 1918 |
| 1,268,151 | Rettell | June 4, 1918 |
| 2,367,189 | Avery | Jan. 16, 1945 |
| 2,518,184 | Renne | Aug. 8, 1950 |
| 2,555,218 | Bailey | May 29, 1951 |
| 2,556,443 | Renne | June 12, 1951 |
| 2,569,140 | Avery | Sept. 25, 1951 |
| 2,606,682 | Cutter | Aug. 12, 1952 |
| 2,656,063 | Kafka | Oct. 20, 1953 |
| 2,797,878 | Crom | July 2, 1957 |